UNITED STATES PATENT OFFICE 2,377,882

BEARING

Franz R. Hensel and Earl I. Larsen, Indianapolis, Ind., assignors to P. R. Mallory & Co., Inc., Indianapolis, Ind., a corporation of Delaware No Drawing. Application August 11, 1942, Serial No. 454,430

10 Claims. (Cl. 308—242)

This invention relates to bearings and particularly to bearings made from metal powders.

An object of the invention is to improve metal powder bearings and their method of manufacture.

Other objects of the invention will be apparent from the description and claims.

The present invention contemplates a bearing formed from relatively coarse silver powder, preferably powder between 80 and 250 mesh size and preferably having a spherical shape, combined with a soft lubricating metal such as lead or thallium. Spherical silver powder particles ranging between 80 and 250 mesh have diameters ranging from 0.058 to 0.177 mm. By the use of silver powders of this size and shape the rate of impregnation is much faster than that obtained with fine powders, such as have generally been used heretofore, for instance powders of —325 mesh. The thoroughness of impregnation is also improved and the physical properties of the finished bearing are better than those obtained with finer powder. Moreover, the finer powder heretofore used has not generally been available in spherical form but consisted of irregular jagged particles which further interfered with thorough impregnation, especially where bearing layers of any substantial thickness were used.

If fine silver powder is pressed and sintered into a porous body and then an attempt is made to impregnate it with molten lead, it is difficult to obtain thorough impregnation, at least unless very thin layers are used. This is believed to be due to in part at least to the formation of a silver-lead eutectic containing 97.5% lead and 2.5% silver, which eutectic melts at 304° C. Silver and thallium form a similar eutectic at 98.7% thallium and 1.3% silver which melts at 289° C. These melting points are below the respective melting points of pure lead and thallium. When a powdered compact made from fine silver powder is used, the finely divided silver at the surface rapidly combines with the lead to form the eutectic which apparently seals the surface of the compact and prevents further impregnation. By using coarser silver powder, particularly if it is of spherical shape and hence of minimum surface area, the formation of the eutectic alloy is much less rapid and hence it does not inhibit impregnation.

As a further aid to impregnation it is contemplated that in some cases the silver-lead or silver-thallium eutectic may be preformed and used to impregnate the silver powder compact.

According to the preferred method of practicing the invention, spherical silver powder of between 80 and 250 mesh size is pressed into a compact of the desired shape, sintered at a temperature below the melting point of silver but sufficiently high to produce welding between the silver particles to thereby form a self-bonded porous body. A suitable sintering temperature is 600–900° C. Bonding between the silver particles can also be accomplished by hot pressing the silver powders at a temperature between 250° C. and 600° C., in which case subsequent sintering is not required. The bonded compact is then placed in contact with molten lead or thallium which readily impregnates the porous body. The degree of porosity, and hence the relative volume percentage of silver and lead or thallium, may be controlled by the pressure used in hot or cold pressing the compact. A preferred density of the silver compact before impregnation is 7.5 grams per c. c. In order to obtain this degree of porosity it is preferable to mix glyptal, paraffin, stearic acid or another volatile binder with the silver powder before pressing. This is volatilized during the sintering operation leaving the desired porosity. Pressed densities of silver powder between 7 and 9 grams per c. c. can readily be obtained, the higher densities being obtained without the use of a volatile binder while the lower densities are obtained when a binder is used.

After impregnation the bearing may be bent or machined to the proper size or shape.

The resulting bearing will be found to have a bonded framework of pure silver with lead or thallium, as the case may be, impregnating and filling the pores in the silver framework. This bearing combines the strength of the silver framework and the anti-friction properties of pure silver and those of substantially pure lead or thallium. Due to the connected silver framework the bearing likewise has very high thermal conductivity which is of considerable importance in bearings in preventing local hot spots which may cause scoring and high thermal stresses leading to early fatigue failures.

A further improvement in the above method of making a bearing may be obtained by using as an impregnating material, instead of pure lead or thallium, the eutectic of lead or thallium with silver, such as the alloy containing 97.5% lead and 2.5% silver which has a melting point of 304° C., or the alloy of 98.7% thallium and 1.3% silver which melts at 289° C. By using the eutectic alloy as an impregnating medium, the solution of silver from the compact is prevented since the lead or thallium is already saturated with silver. This prevents the retardation of impregnation due to eutectic formation and also makes possible impregnation at lower temperatures since the eutectic alloys melt at lower temperatures than pure lead or thallium.

Another method of making a bearing consists in pressing the silver powder mixed with a small percentage, such as .1 to 5% of lead or thallium powder, sintering the pressed mixture and then introducing further lead or thallium by impregnation as previously described. It is also contemplated in some cases that the coarse spherical silver powder and lead or thallium powder or the eutectic alloy of lead or thallium with silver may be mixed in the proportions desired in the finished bearing, such as silver 98%, lead or thallium 2%, and the mixed powders pressed and sintered to form the completed bearing compact.

In certain instances, particularly where a self-bonded silver framework has been produced, we have found that the compressed compact may be further improved by using an homogenizing treatment which results in further grain growth of the silver particles and which increases the strength, elongation and thermal conductivity considerably. The homogenizing treatment may comprise heating the silver compact for several hours at a temperature within the range of 700–950° C.

Where increased hardness and strength are desired in the bearing, even though the anti-friction characteristics may be reduced, we have found it of advantage to use a silver alloy powder of the preferred mesh size and spherical shape instead of pure silver. The preferred silver alloy is silver containing a small proportion of copper, such as 2 to 10% copper, or preferably 5 to 7½% copper. The strength of the silver-copper alloy framework may be improved by a heat treatment consisting in quenching the sintered compact from an elevated temperature such as 780° C., and subsequently aging for an extended period, such as two hours, at 280° C., to produce a precipitation hardening of the alloy. The quenching is preferably preceded by an homogenizing treatment consisting of holding the compact at a temperature between 650° C. and 800° C., preferably 750° C., for sixteen hours. After quenching, the aging may take place at a temperature within the range 200° C. to 350° C., depending upon the length of the aging period. It is found that such age hardening nearly doubles the tensile strength of the sintered compact and materially increases its thermal conductivity. For instance, in one case a sintered compact which was not heat treated had a tensile strength of 30,000 pounds per square inch, while after homogenizing, quenching and aging, the compact was found to have a tensile strength of over 50,000 p. s. i.

Where it is desired to further improve the rate and thoroughness of impregnation, it is contemplated that a small percentage of alloying ingredients may be added to the lead or thallium prior to impregnation to improve their fluidity. Such ingredients are preferably selected to increase the fluidity without increasing the alloying tendency with the silver. These ingredients may comprise, for example, small percentages of lithium, calcium, antimony, tellurium, indium, zinc, cadmium, bismuth, tin.

For many bearing applications it is necessary to provide a backing of steel or other high strength metal for additional support. In such cases the silver powder compact may be formed directly against the steel surface and the silver sintered thereto during the sintering operation. It is preferable in such cases to plate the steel with a thin layer of silver, nickel or copper to improve the bonding. Sintering at a temperature above 600° C. will then produce a strong bond, the silver particles being welded directly to the plated surface of the steel. The lined bearing shell thus produced may then be impregnated with lead or thallium by placing the lower melting metal against the porous silver face and heating in a furnace to a temperature above the melting point of the lead or thallium, such as 350° C. After impregnation the bearing may be formed or machined to the desired size and shape.

It is also possible to form a bearing by placing a layer of loose silver powder on the surface of a silver plated steel strip and place the assembly in a furnace to sinter the silver powder onto the steel. The sintered layer may then be rolled to compact the silver to the desired density, after which it may be impregnated with lead or thallium. Impregnation may be accomplished by placing the lower melting point metal on the surface of the silver and heating in a furnace, or the lead or thallium may be electroplated onto the porous silver surface and then the plated body heated to complete the impregnation.

In the case of cylindrical or semi-cylindrical bearings, the silver powder may be pressed inside the steel shells by use of an expanding die or other suitable pressing means and then impregnated with lead by placing a block of refractory material, such as graphite, or high melting point metal having a graphite or refractory coating into the shell to retain the molten lead in place during impregnation.

While specific embodiments of the invention have been described, it is intended to cover the invention broadly within the spirit and scope of the appended claims.

What is claimed is:

1. A bearing comprising a self-bonded metal body comprising silver powder having a particle size between 80 and 250 mesh and a soft, lower melting point lubricating metal interspersed therewith.

2. A bearing comprising a self-bonded metal body comprising silver powder having a particle size between 0.058 and 0.177 millimeter and a soft, lower melting point lubricating metal interspersed therewith but substantially unalloyed therewith, selected from the group consisting of lead and thallium.

3. A bearing comprising a self-bonded metal body comprising silver powder formed of spherical particles having a size between 80 and 250 mesh and a soft, lower melting point lubricating metal filling the interstices between the silver powder particles, selected from the group consisting of lead and thallium.

4. A bearing comprising a metal body formed of a sintered mass of spherical silver powder particles having a diameter between 0.058 and 0.177 millimeter, said mass of silver powder particles comprising a self-bonded porous body, and a soft, lower melting point metal selected from the group consisting of lead and thallium filling the interstices in said porous body.

5. A bearing comprising a self-bonded metal body comprising silver powder having a particle size between 0.058 and 0.177 millimeter and a soft, lower melting point lubricating metal interspersed therewith but substantially unalloyed therewith, selected from the group consisting of lead-silver and thallium-silver alloy.

6. A bearing comprising a metal body formed of a sintered mass of spherical silver powder particles having a diameter between 0.058 and 0.177 millimeter, said mass of silver powder particles comprising a self-bonded porous body, and a soft, lower melting point metal selected from the group consisting of lead-silver and thallium-silver eutectic alloy.

7. A bearing comprising a sintered mass of silver alloy particles forming a self-bonded porous body, said alloy containing 2 to 10% copper, and a soft lower melting point lubricating metal filling the interstices in said porous body.

8. A bearing comprising a sintered mass of silver alloy particles forming a self-bonded porous body, said alloy containing 2 to 10% copper, and a soft lower melting point lubricating metal filling the interstices in said porous body, at least part of the copper in said silver alloy being precipitated in the form of a precipitation hardening ingredient therein.

9. A bearing comprising a steel backing and a sintered porous silver body sintered thereto, said body comprising a self-bonded mass of silver powder particles of between 80 and 250 mesh size, and a lower melting point lubricating metal filling the interstices in said body.

10. A bearing comprising a steel backing and a sintered porous silver body sintered thereto, said body comprising a self-bonded mass of silver powder particles of between 80 and 250 mesh size, and a lower melting point lubricating metal filling the interstices in said body, said lubricating metal being selected from the group consisting of lead and thallium.

FRANZ R. HENSEL.
EARL I. LARSEN.